United States Patent [19]

Kristiansen

[11] 3,995,364
[45] Dec. 7, 1976

[54] METHOD FOR MANUFACTURING A TUBULAR-SHAPED MULTILAYER COIL FOR ELECTRICAL MACHINES

[75] Inventor: Henry Kristiansen, Sachseln, Switzerland

[73] Assignee: Interelectric Aktiengesellschaft, Sachseln, Switzerland

[22] Filed: May 30, 1975

[21] Appl. No.: 582,195

Related U.S. Application Data

[63] Continuation-in-part of Ser. No. 397,265, Sept. 14, 1973, abandoned.

[52] U.S. Cl. .................. 29/598; 29/605; 140/92.1; 310/266
[51] Int. Cl.² ...................... H02K 15/02
[58] Field of Search ............ 29/598, 605; 140/92.1, 140/92.2; 310/266, 264, 265

[56] References Cited
UNITED STATES PATENTS

| | | | |
|---|---|---|---|
| 2,759,116 | 8/1956 | Glass | 29/598 |
| 3,441,761 | 4/1969 | Painton et al. | 29/598 |
| 3,793,548 | 2/1974 | Faulhaber | 310/266 |

*Primary Examiner*—Carl E. Hall
*Attorney, Agent, or Firm*—Frederick E. Bartholy

[57] ABSTRACT

A method of winding a tubular-shaped multilayer coil usable as an ironless rotor for electrical motors. A cylindrical form having a rhomboidal cross-section is used as a core for making a cylindrical winding having a number of taps intended to be connected to a commutator of a slip ring device. The cylindrical winding is stripped off from the cylindrical form and flattened to a bandlike structure without deforming the configuration of the windings. The bandlike structure is bent and the ends thereof are joined to form a tubular-shaped coil usable as an ironless rotor. The wire is wound on the cylindrical core in a multilayer formation by alternating the direction of axial advancement or displacement of the windings so as to form a cylindrical winding having a thickness of at least three times that of the diameter of the insulated wire.

6 Claims, 6 Drawing Figures

METHOD FOR MANUFACTURING A TUBULAR-SHAPED MULTILAYER COIL FOR ELECTRICAL MACHINES

CROSS-REFERENCES TO RELATED APPLICATIONS

This application is a continuation-in-part of my copending application Ser. No. 397,265 filed Sept. 14, 1973 and entitled "Coreless rotor with multilayer winding for electric motors", now abandoned.

BACKGROUND OF THE INVENTION

The invention pertains to the field of manufacturing ironless, self-supported rotors for electric motors.

It is known to manufacture tubular-shaped ironless rotors by winding onto a form a length of insulated wire in a non-overlapping configuration, separating the so formed length from the form and deforming the so-formed length of wire into a substantially flat configuration and thereafter joining the ends of the flattened structure to form a tubular-shaped coil. Such a method results in a coil having two layers of wire and accordingly a thickness of double the diameter of the wire. This known method is applicable only to wires of relatively heavy gauge.

According to another known method, an insulated wire is wound on a flat magnetic core, which is thereafter bent into a tubular-shaped configuration. The coil is composed of individual or distinct groups of windings, and in each group of windings the individual layers have a decreasing number of turns, which leads to a trapezoidal configuration as to the cross-section of each group. Thus, any disired length of a bandlike coil structure may be cut intermediate adjacent groups of windings without separating more than one winding. This known method does not lead to an ironless rotor. Besides, the windings on the core lie in a plane intersecting the coil axis.

BRIEF SUMMARY OF THE INVENTION

It is an object of the invention to provide a method for manufacturing a tubular-shaped multilayer coil which has a thickness of at least three times the diameter of the insulated wire. It is another object to provide a method which leads to a multilayer coil having a good copper-filling factor, a symmetrical structure and a relatively even thickness.

These and other objects are achieved by winding the wire on a cylindrical form of rhomboidal cross-section in a pilgrim's step like manner by alternating the direction of axial advancement of the windings between adjacent terminals.

DETAILED DESCRIPTION OF A PREFERRED EMBODIMENT

Figure 1:
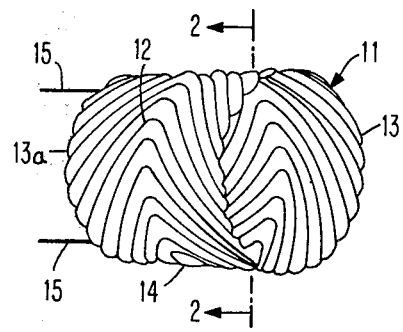
FIG. 1 is a schematic, perspective view of a tubular-shaped coil manufactured according to the invention.
Figure 2:
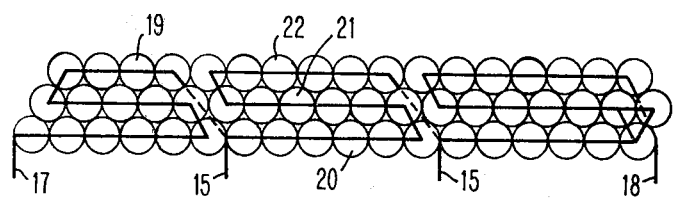
FIG. 2 is a cross-sectional view taken along line 2—2 of FIG. 1 and in an unfolded position.

For manufacturing a tubular-shaped multilayer coil as shown in FIG. 1, a cylindrical form is used having a rhomboidal cross-section. A length of insulated wire is wound around said cylindrical form in such a manner that a multilayer cylindrical winding is formed, in which the direction of the axial advancement of said windings is alternating between adjacent terminals. FIG. 2 shows the upper half of an axially cross-sectional view of the cylindrical winding. It may be seen that the winding starts at terminal 17 and that six turns are wound in the advance direction of axial displacement of the turns or windings, thereupon five turns are wound in a second layer in the reverse direction of displacement. Thereupon, four turns 19 are wound in the advance direction of displacement onto said second layer, and winding is continued for another six turns 20 which, however, form the first layer of a second portion of said cylindrical coil. Between the end of the last winding 19 and the beginning of the first winding 20 a loop is formed serving as a terminal. Following the first layer of windings 20, a second layer comprising six turns 21 is wound in the reverse direction of advancement, and thereupon the first turn of a third layer is wound in the same direction of displacement, whereupon five additional turns 22 are wound in the advance direction of displacement. At the end of the last turn, another loop 15 is formed and winding of the third and last portion of the cylindrical winding is started. The so formed cylindrical coil is stripped off from the cylindrical form and flattened to a bandlike structure shown in FIG. 4 in a manner known in the art.

Figure 5:
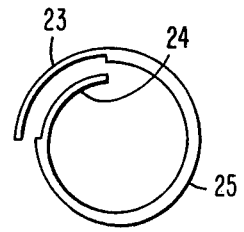
FIG. 5 is a side view of the flattened structure as shown in FIG. 4 when bent into a circular form, but before joining the end portions.

The so formed bandlike structure is rolled to a tubular-shaped configuration as shown in FIG. 5, and the end portions 23 and 24 thereof which have half the thickness of the intermediate portion 25, are joined by an adhesive or any other appropriate means so as to form the tubular-shaped multilayer coil as shown in FIG. 1.

It is to be understood that the ideal configuration of the cylindrical winding shown in FIG. 2 is not essential for achieving the objects of the invention. Even if the turns are not wound in such a regular manner as shown in FIG. 2, this will result in a compact tubular-shaped multilayer coil of great uniformity. In the embodiment shown in FIG. 2, reversal of the direction of axial advancement of the windings takes place at the ends of each portion of the winding, which portions are defined by terminals 17 and 18 and intermediate terminals 15.

Figure 3:
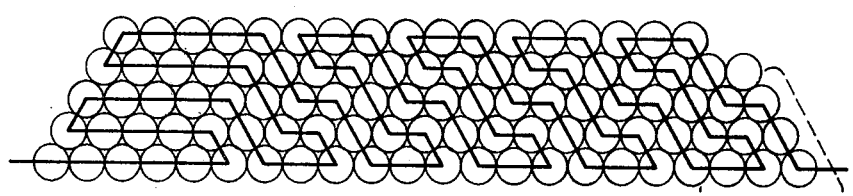
FIG. 3 is a view similar to that of FIG. 2, representing a modified form of winding.

It is within the scope of the invention to wind each of the portions of the cylindrical coil such that the direction of axial displacement is reversed after a number of turns occupying a width smaller than the width of a portion of said cylindrical winding. Such a configuration is shown in FIG. 3, which is a view similar to FIG. 2, but of a single portion of the cylindrical winding. It may be seen from FIG. 3 that at the beginning of the same successive windings are arranged in a pattern different from that in the following part of the winding. The turns within each distinct direction of axial advancement do not necessarily lie within one layer, but may cover all layers. In practice, the pattern of successive windings will depart from the regular pattern of FIG. 3, however, in any case the advantages of the invention will be realized.

As may be seen from FIG. 3, the left-hand or beginning portion of the coil is constituted consecutively by six windings from left to right, five windings in the reverse direction, nine windings from left to right, eight windings in the reverse direction, and eleven windings from left to right. This beginning of the coil is followed repeatedly by groups of turns having six turns in the reverse direction and nine turns in the forward direction of advancement.

Figure 4:
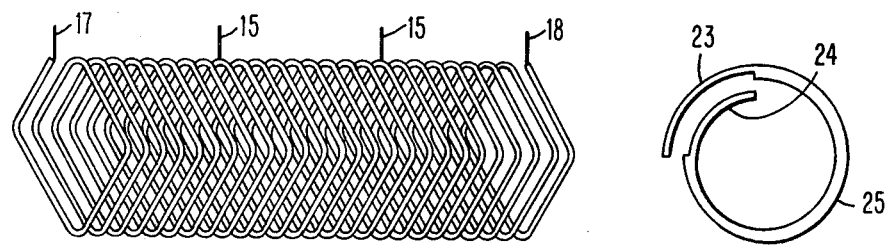
FIG. 4 is a diagrammatic top view of the flattened structure of the cylindrical winding.

The cylindrical winding, when flattened to a bandlike structure, is diagrammatically shown in FIG. 4 in which the multilayer structure of the windings is shown, for the sake of simplicity, as a single layer. The configuration of the windings of the bandlike structure is identical to the configuration of the windings when the insulated wire has been wound onto the cylindrical form.

Generally, the method according to the invention will lead to a greater symmetry in the arrangement of the distinct turns compared to coils manufactured according to known methods. The smaller the diameter of the wire, the more uncertain it is that the turns will follow the pattern shown in FIG. 3. However, in any case a better and denser packing will result than in winding arrangements that were heretofore used.

Figure 6:
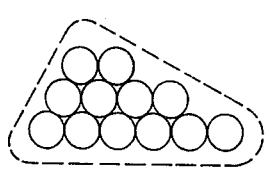
FIG. 6 is a cross-sectional view of the encircled area of FIG. 3 in an enlarged scale according to an alternate embodiment, in which two adjacent wires are concurrently wound onto the cylindrical form.

Instead of using one insulated wire, two or more insulted wires may be wound in parallel and adjacent each other onto the cylindrical form. This will lead to an arrangement of the turn as shown in FIG. 6, which shows in an enlarged scale the encircled portion of the cylindrical winding shown in FIG. 3. By this, a tubular shaped multilayer coil having definite electrical characteristics will lead to a greater length and a lower thickness of the rotor coil. The higher the number of insulated wires wound concurrently onto the cylindrical form, the higher will be the length to thickness ratio of the coil.

The axial displacement of successive turns need not and in practice will not necessarily be constant. In the ideal arrangement according to FIGS. 2 and 3, successive windings in one and the same layer have an axial displacement of successive turns corresponding to the diameter of the wire. When a turn changes from one layer to another, the axial displacement corresponds to half a diameter of the wire.

I claim:

1. The method of winding a tubular-shaped multi-layer coil used as an ironless rotor in electrical motors, comprising the steps of winding at least one insulated wire around a cylindrical form having a rhomboidal cross-section, providing taps while winding said wire on said form after a number of windings corresponding to an integral fraction of the desired total number of windings on said form have been completed, removing the windings from said form, deforming said windings to a bandlike structure, bending said structure to a tubular-shaped coil and joining the ends of said coil, the wire being wound on said form in a multilayer formation by alternating the direction of axial advancement of said windings at least twice between adjacent terminals of said cylindrical winding.

2. A method as claimed in claim 1, wherein the cylindrical winding is wound with a constant number of turns in a first direction of axial advancement and with a constant number of turns in the second, reverse direction of advancement.

3. A method as claimed in claim 1, wherein the cylindrical winding is wound with a constant number of turns in a first direction of axial advancement and with a constant, but lower number of turns in the second, reverse direction of advancement.

4. A method as claimed in claim 1, wherein at least two wires adjacent and in parallel to one another are wound onto said cylindrical form.

5. A method of winding a tubular-shaped multilayer coil used as an ironless rotor for electrical motors, comprising the steps of winding at least one insulated wire ground a cylindrical form having a rhomboidal cross-section, providing winding taps to subdivide said cylindrical winding into equal portions, removing the so formed cylindrical winding from said form, flattening the cylindrical winding to a bandlike structure, bending said bandlike structure to a tubular-shaped coil and joining the ends of said coil, wherein the wire is wound onto said form by alternatively changing the direction of axial displacement of the windings an even number of times in each portion of said winding.

6. A method as claimed in claim 5, wherein the cylindrical winding is wound with a higher number of turns in the advance direction of axial displacement of the windings than in each reverse direction of said axial displacement.

* * * * *